United States Patent

Stahl

[11] Patent Number: 5,682,705
[45] Date of Patent: Nov. 4, 1997

[54] TRAP

[76] Inventor: Michael Stahl, Box 65, Elie, Manitoba, Canada, R0H 0H0

[21] Appl. No.: 240,558

[22] Filed: May 11, 1994

[51] Int. Cl.$^6$ .................................................. A01M 23/08
[52] U.S. Cl. ........................................ 43/66; 43/61
[58] Field of Search ............................ 43/61, 64, 65, 43/66, 67, 74

[56] References Cited

U.S. PATENT DOCUMENTS

| 38,458 | 5/1863 | Barker | 43/66 |
| 934,469 | 9/1909 | Sloup | 43/66 |
| 1,033,761 | 7/1912 | Kempfe | 43/61 |
| 1,063,347 | 6/1913 | Hall | 43/66 |
| 1,138,132 | 5/1915 | Marsh | 43/66 |
| 4,984,382 | 1/1991 | Yost | 43/64 |
| 5,347,747 | 9/1994 | Henriques | 43/66 |

FOREIGN PATENT DOCUMENTS 0749126  5/1956  United Kingdom ................ 43/65

*Primary Examiner*—Mark Rosenbaum
*Assistant Examiner*—James Miner
*Attorney, Agent, or Firm*—Murray E. Thrift; Adrian D. Battison

[57] ABSTRACT

An animal trap has a rectangular housing with one or more access openings in the side. The preferred trap has two access openings in adjacent sides, at diametrically-opposed corners. A tunnel leads from each access opening into the container. Within the tunnel is a gravity door, pivoted at the top and sloping inwardly so that an animal may push the door open to enter the container but cannot open the door to the outside. The door is perforated and carries a lure housing on its inside surface. An odoriferous lure is carried in the lure housing to attract animals into the access opening an through the tunnel. For use in very cold weather, a heating wire, preferably battery powered, may be used to warm the lure.

10 Claims, 2 Drawing Sheets

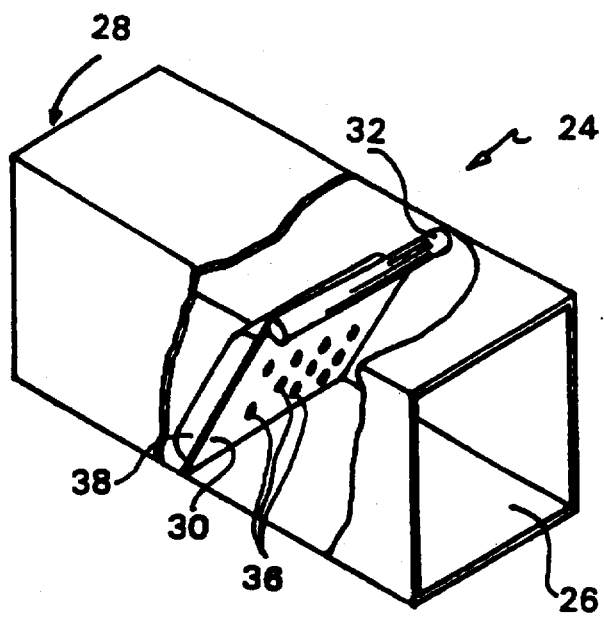
FIG. 3
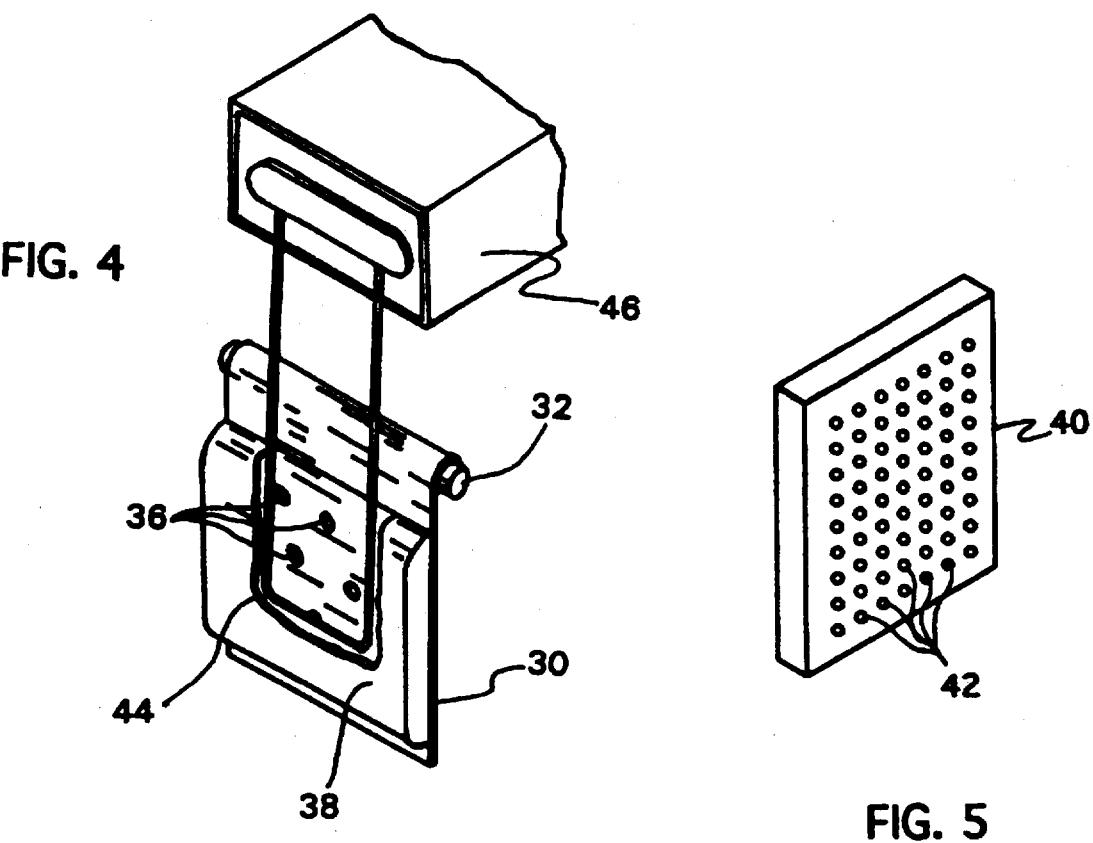
FIG. 4
FIG. 5

TRAP

FIELD OF THE INVENTION

The present invention relates to animal traps.

BACKGROUND

The invention is concerned with a container-type trap with a one-way entrance, allowing an animal to enter but preventing its escape.

SUMMARY

According to the present invention there is provided an animal trap comprising:

a container for housing animals to be trapped;

at least one access opening into the container;

a tunnel having an entrance end and an exit end, the tunnel communicating at one of its ends with the access opening;

one-way door means comprising a panel mounted in the tunnel for allowing passage of an animal from the entrance end to the exit end of the tunnel and for preventing passage of an animal through the tunnel from the exit end to entrance end, the door panel having a plurality of openings therethrough; and a lure housing mounted on the door panel, on a side thereof facing towards the tunnel exit, the housing having an interior in communication with the openings through the door panel.

In use of the trap, an odoriferous lure is placed in the lure housing attached to the door panel. The holes in the panel allow the animal-attracting odor of the lure to escape into the entrance tunnel. An animal drawn by the odor will enter the tunnel and pass through the door to what appears to be the source of the odor, inside the door. Once in the container, the door panel shuts, and the animal is trapped.

This arrangement prevents the animal from getting to the lure, as it is enclosed in the lure housing. It also ensures that the odor of the lure is fully effective in attracting animals to the trap and is not confined in any way to the interior of the container. The lure continues to be effective even when an animal has already been trapped.

In preferred embodiments of the invention, the door is a gravity-closed pivoting door panel. The container is rectangular, with two tunnels extending into the container from access openings in two adjacent sides, at diagonally-opposite corners. This provides for the most convenient positioning when the trap is located in a corner between two walls.

For use in cold weather, a heater, for example a heating wire, may be used in the lure housing to warm the lure to ensure that adequate odor is emitted.

BRIEF DESCRIPTION OF THE DRAWINGS

In the accompanying drawings, which illustrate an exemplary embodiment of the present invention:

FIG. 3 is an isometric view of a tunnel, partially broken away to show the door panel;

FIG. 4 is a back isometric of the door, partially broken away to show an included heating wire; and FIG. 5 is an isometric view of a lure.

DETAILED DESCRIPTION

Figure 1:
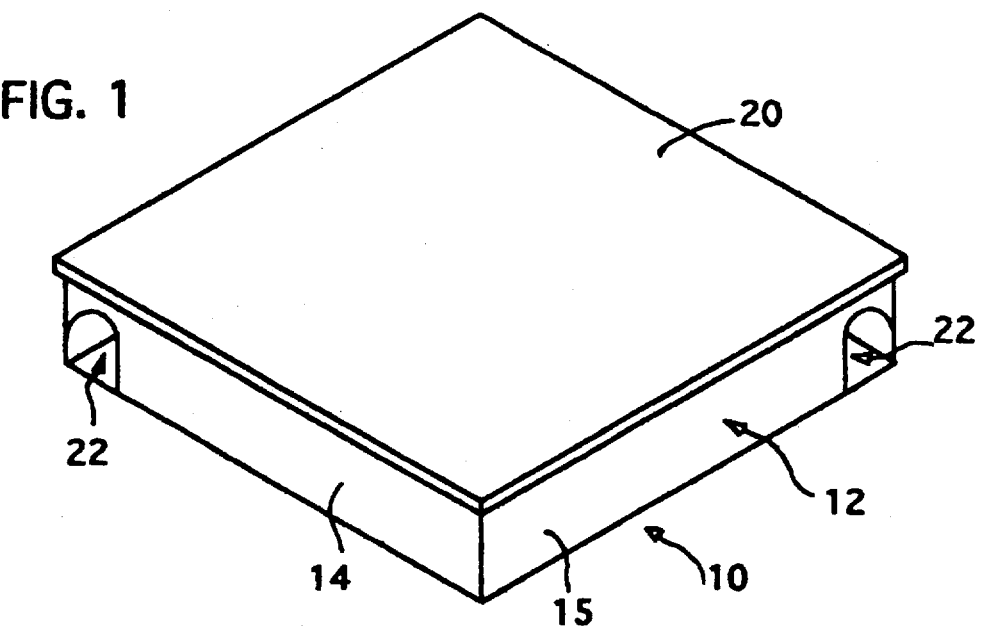
FIG. 1 is an isometric view of a trap according to the present invention.
Figure 2:
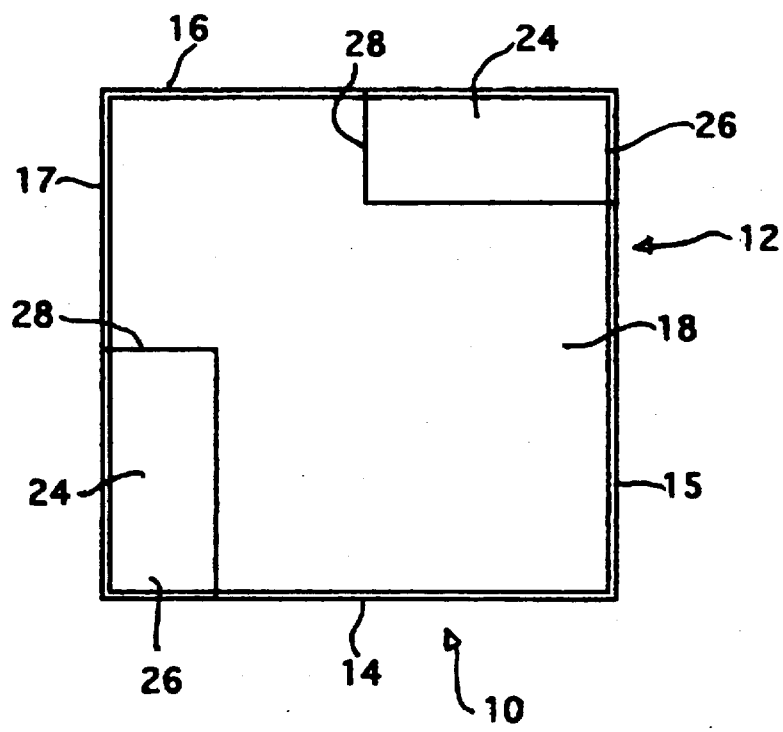
FIG. 2 is a plan view of the trap with the cover removed.

Referring to the accompanying drawings, and especially to FIGS. 1 and 2, there is illustrated a trap 10 that includes a rectangular container 12 with side walls 14, 15, 16 and 17. The container has a closed bottom 18 and a removable cover 20. Two adjacent walls 14 and 15 each have access openings 22 at diametrically opposed corners. Inside each access opening is a tunnel 24 with an entrance end 26 at the access opening and an exit end 28 opening into the interior of the container 12. The configuration of the tunnel is most clearly illustrated in FIG. 3. Part way along the tunnel is a door panel 30 with a horizontal pivot 32 along its top edge. The pivot is seated in mating openings (not shown) in opposite sides of the tunnel.

The door panel has an overall height between the pivot 32 and the bottom edge 35 of the door panel that is greater than the height of the tunnel between the bottom of the tunnel and the pivot 32. Consequently, the normal position of the door is inclined downwardly and towards the exit end of the tunnel. The door is arranged to pivot upwardly towards the exit end of the tunnel and, when released, to fall down under gravity to the normal position. This means that the door panel can be pushed towards the open position from the outside but not from the inside.

The door panel has a series of through openings 36 that are exposed on the outer side of the door panel. On the inner side of the door panel, facing towards the exit end of the tunnel, is a lure housing 38. This is a generally rectangular housing that is closed on the top, bottom, sides and back. It houses a lure 40 (FIG. 5) of absorbent material impregnated with an odoriferous material that is attractive to animals of the type that are to be trapped. In this preferred embodiment of the invention, the lure 40 is a thick piece of raw leather perforated by many small holes 42, For attracting rats and mice, this leather is soaked in hot lard. For mink, skunks, weasels, cats etc., cod liver oil or sardine oil is used.

Where the trap is to be used in cold weather, a heating wire 44 is formed into a loop and inserted into the lure housing. The ends of the wire are connected to a battery 46 that may conveniently be mounted on top of the tunnel. This generates a small amount of heat inside the lure housing to warm the lure so that a strong odor is emitted from the trap.

The arrangement of the trap entrances at opposite corners as described allows the convenient placement of the trap in any corner.

While one embodiment of the invention has been described in the foregoing, it is to be understood that other embodiments may be produced without departing from the scope of the invention. Thus, for example, it is possible to produce models with collapsible containers to enable trappers and exterminators to transport large numbers of traps. This also assists in shipping.

Unlike many prior traps, the present trap requires neither rewinding nor resetting. It may be manufactured of durable metal. The soaked leather lure will last a very long time under normal usage conditions. The container may be manufactured in a compact size, with a low profile to fit into places of low height and into corners.

This invention is therefore to be considered limited solely by the scope of the appended claims.

I claim:

1. An animal trap comprising:

a container for housing trapped animals;

at least one access opening into the container;

a tunnel within the container, the tunnel having an entrance end and an exit end, the tunnel entrance end being located at the access opening, and the tunnel extending from the access opening into the container;

one-way door means comprising a panel mounted in the tunnel for allowing passage of an animal from the entrance end to the exit end of the tunnel and for preventing passage of an animal through the tunnel from the exit end to entrance end, the door panel having a plurality of openings therethrough; and a lure housing for enclosing a lure, the lure housing being mounted on the door panel, on a side thereof facing towards the tunnel exit, the housing having an interior in communication with the openings through the door panel.

2. A trap according to claim 1 including pivot means pivotally mounting the door panel in the tunnel for pivotal movement about a substantially horizontal axis adjacent a top side of the door panel, and means limiting pivotal movement of the panel to movement between an open position projecting from the pivot means towards the tunnel exit end and a closed position extending downwardly from the pivot means, across the tunnel.

3. A trap according to claim 2 wherein the door panel has a height between a bottom edge and the pivot means that is greater than the height of the tunnel between the bottom of the tunnel and the pivot means.

4. A trap according to claim 1, including plural access openings with corresponding tunnels, door means and lure housings.

5. A trap according to claim 4 wherein the container is substantially rectangular and including two access openings in adjacent sides of the container, the access openings being adjacent diametrically-opposite corners of the container.

6. A trap according to claim 1, including an odoriferous lure in the lure housing.

7. An animal trap comprising:

a container for housing animals to be trapped;

at least one access opening into the container;

a tunnel having an entrance end and an exit end, the tunnel communicating at one of its ends with the access opening;

one-way door means comprising a panel mounted in the tunnel for allowing passage of an animal from the entrance end to the exit end of the tunnel and for preventing passage of an animal through the tunnel from the exit end to entrance end, the door panel having a plurality of openings therethrough;

a lure housing mounted on the door panel, on a side there of facing towards the tunnel exit, the housing having an interior in communication with the openings through the door panel; and an odoriferous lure in the lure housing, said lure comprising an absorbent material impregnated with an odor-emitting material.

8. An animal trap comprising:

a container for housing animals to be trapped;

at least one access opening into the container;

a tunnel having an entrance end and an exit end, the tunnel communicating at one of its ends with the access opening;

one-way door means comprising a panel mounted in the tunnel for allowing passage of an animal from the entrance end to the exit end of the tunnel and for preventing passage of an animal through the tunnel from the exit end to entrance end, the door panel having a plurality of openings therethrough;

a lure housing mounted on the door panel, on a side thereof facing towards the tunnel exit, the housing having an interior in communication with the openings through the door panel;

an odoriferous lure in the lure housing; and heating means for heating the interior of the lure housing.

9. A trap according to claim 8 wherein the heating means comprise an electrical heating element.

10. A trap according to claim 9 wherein the heating means further comprise an electric battery coupled to the heating element.

* * * * *